(No Model.) 2 Sheets—Sheet 1.

H. B. OWSLEY.
BICYCLE.

No. 466,983. Patented Jan. 12, 1892.

Witnesses:
Charles O. Tierney
C. P. Smith

Inventor:
Harry B. Owsley
By Wiles, Greene and Bitner.
Attys.

(No Model.) 2 Sheets—Sheet 2.

H. B. OWSLEY.
BICYCLE.

No. 466,983. Patented Jan. 12, 1892.

Witnesses:
Charles O. Shorvey
C. P. Smith

Inventor:
Harry B. Owsley
By Wiles, Frume and Bitner
Attys.

UNITED STATES PATENT OFFICE.

HARRY B. OWSLEY, OF CHICAGO, ILLINOIS.

BICYCLE.

SPECIFICATION forming part of Letters Patent No. 466,983, dated January 12, 1892.

Application filed August 7, 1891. Serial No. 401,971. (No model.)

*To all whom it may concern:*

Be it known that I, HARRY B. OWSLEY, a citizen of the United States of America, residing at Chicago, in the county of Cook and State of Illinois, have invented certain new and useful Improvements in Bicycles, of which the following is a specification.

My invention relates to improvements in bicycles, and is fully described and explained in this specification and shown in the accompanying drawings, in which—

Figure 1:
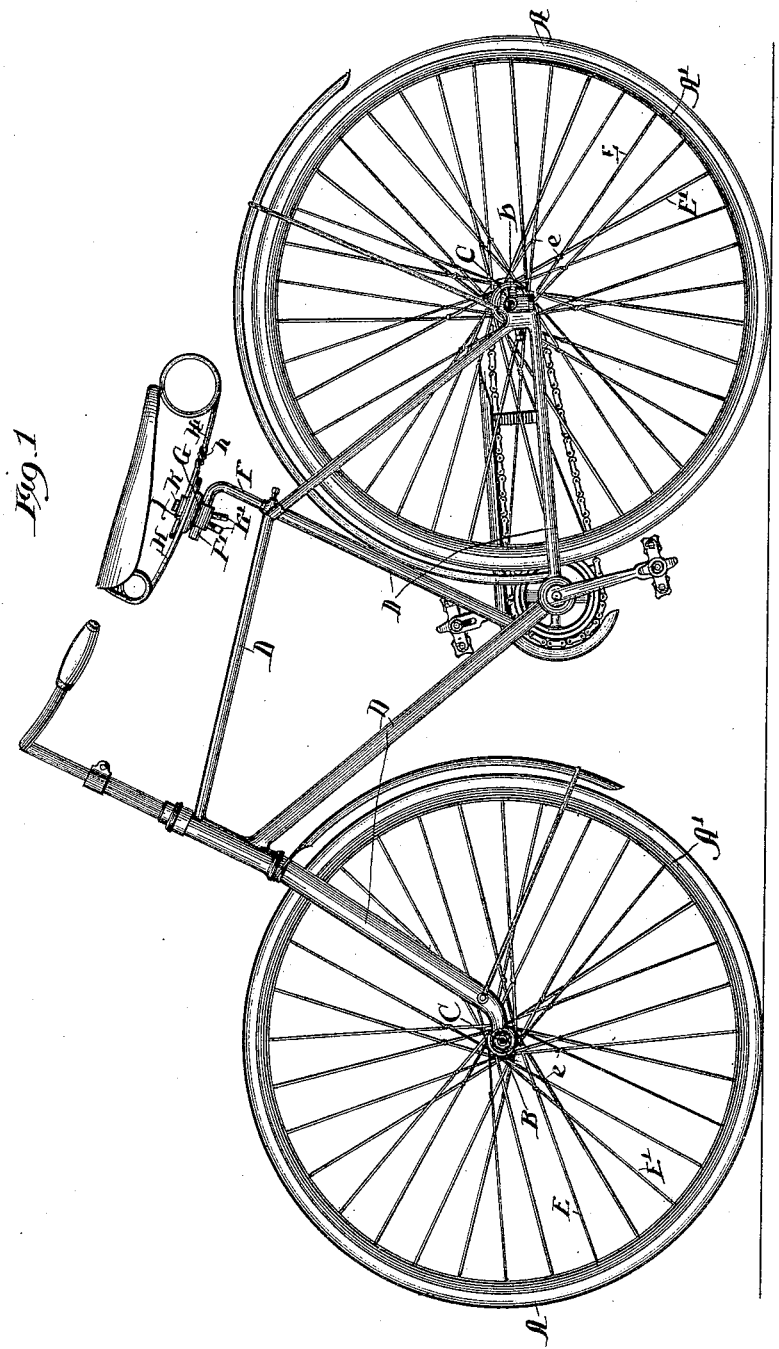
Figure 2:
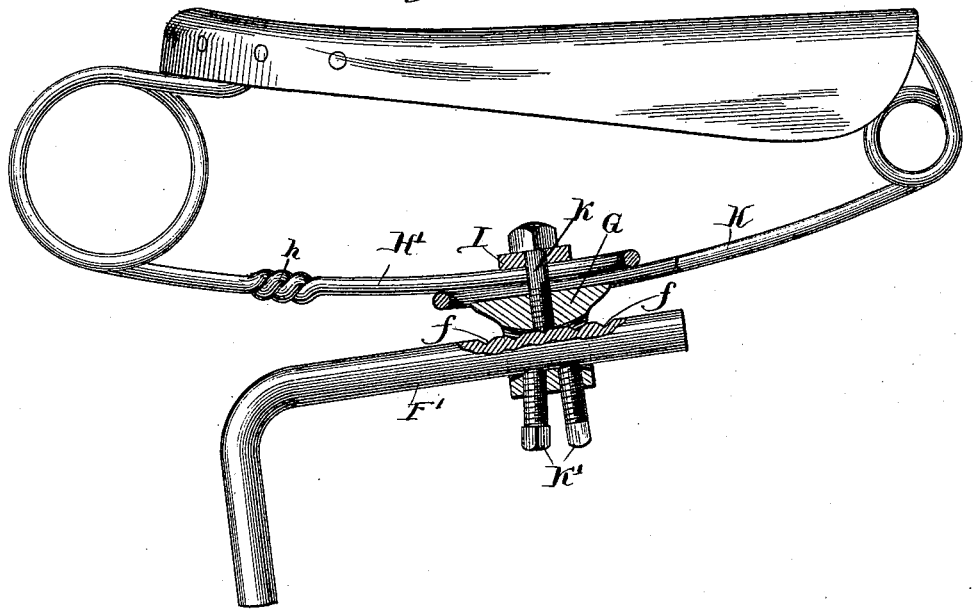
Figure 3:
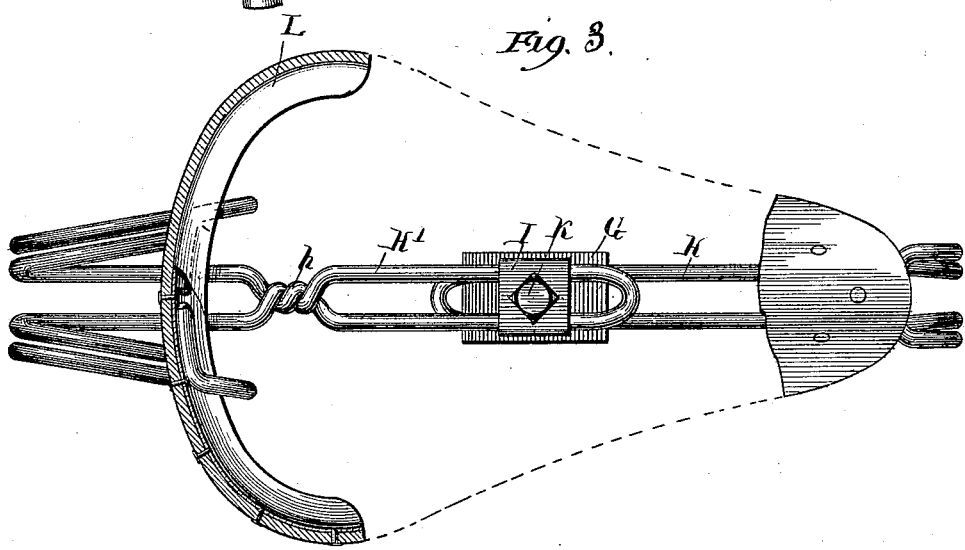

Figure 1 is a side elevation of a bicycle embodying my improvements. Fig. 2 is a view of the saddle of the bicycle, partly in side elevation and partly in vertical section; and Fig. 3 is a top plan of the saddle, a portion of the leather seat being broken away to show the parts beneath.

In the views, A A are the wheels, B B the hubs, and C C the axles, of a bicycle of well-known general form, and D is the frame of the bicycle, resting on and supported by the axles, the various parts of the frame not being designated by different letters, as my invention does not in any way relate to the frame or its component parts.

The hub and its flanges, the axle, and the felly of each wheel are of forms well known in bicycle construction, and each of the hub-flanges is connected with the felly A' by a suitable number of tangent spokes arranged in pairs, the two spokes E E' of each pair being crossed and connected at their intersection.

In the drawings, F represents the vertical member, and F' the horizontal member, of the saddle-pillar of the bicycle, the upper surface of the horizontal member F' being formed with a series of conical countersinks $f$, whose purpose is hereinafter explained. Upon the horizontal member F' is a clamp G, which supports the front and rear springs H H' of the saddle, the springs being held in place by a transverse plate I and bolt K. The longitudinal opening in the clamp G through which the horizontal member F' of the saddle-pillar passes is of varying vertical diameter, its vertical diameter being least at the center and gradually increasing toward both its ends, as illustrated in Fig. 3, this construction being for the purpose of allowing the clamp and the saddle which it supports to rock in the vertical plane of the saddle-pillar and its horizontal extension, in order to vary the inclination of the saddle. The bolt K is coned at its tip, and is of such length as to enter the countersink $f$ in the member F' of the saddle-pillar, and two set-screws K' are inserted in the lower face of the clamp G and impinge upon the lower surface of the member F'. It is evident that by means of the two sets-screws K' the clamp G and the saddle supported by it may be readily adjusted and firmly held in any desired position, and this device therefore furnishes a simple and effective means of changing the inclination of the saddle and fixing it securely, as desired. At the same time the bolt K by its engagement with any one of the series of countersinks $f$ fixes the position of the saddle upon the member F' and prevents lateral rocking of the clamp and saddle.

The front and rear springs H H' of the saddle are in general form the same as springs in common use for this purpose, the front spring H, as shown, being in all respects similar to well-known springs of this class. Each of the springs is formed by bending a suitable rod at its center to form a loop or stirrup, the two limbs of the rod being brought into practically parallel lines and formed into suitable coils and the free ends being so bent as to engage with front and rear saddle-rims, one of which is shown at L, Fig. 4. The closed or loop ends of the two springs overlap each other upon the clamp fastened to the saddle-pillar and are held in place in the manner hereinbefore set forth. The form of the front spring and its coils is such as to give it sufficient lateral rigidity; but it has been found in practice that the length of the rear spring and the size and position of its coils tend to make it more or less unsteady, thereby causing lateral vibration of the rear end of the saddle. To obviate this difficulty the two limbs of the straight portion of the rear spring have hitherto been bound together by various forms of clamps, all adding to the expense and complication of the saddle and to its liability to get out of repair.

In the saddle shown in the drawings I have dispensed with any extra clamping device for connecting the two limbs of the rear spring and have joined them by intertwisting them at a suitable point in their length, as shown at $h$, Figs. 2 and 3, the union thus formed being simple, inexpensive, and as durable as the spring itself. The connection thus made has the effect and is for the purpose already set forth, and it is evidently in every way superior to a connection of the two members of the spring by any sort of separate clamp.

As shown in Figs. 2 and 3, the closed ends of the two springs H H' overlap each other upon the clamp G, and the free or separate ends of the springs engage the metal rims at the ends of the seat. It is evident, however, that this arrangement may be reversed as to either or both of the springs, the free ends of either spring being placed at the center of the saddle and the closed end being brought into engagement with the rim at the end of the seat.

While I have shown and described the pointed bolt K and set-screws K' as used in combination and while their use together adds to the perfection of the operation of the clamp, it is plain that the set-screws may be used in combination with the clamp without the pointed bolt, and on the other hand that the bolt may be used without the set-screws, and that either of these elements of the device when so used independently will perform its specific function and secure the result for which it is intended.

Having now described and explained my invention, what I claim as new, and desire to secure by Letters Patent, is—

1. The combination, with the saddle-pillar F, having the horizontal member F', formed with countersinks $f$ in its upper surface, of the saddle-clamp G, encircling the member F' and supporting the saddle, and the bolt K, set in the upper surface of the clamp and formed with a point adapted to enter the countersinks $f$, thereby fixing the position of the clamp upon the member F' and preventing lateral rocking of the clamp and saddle, substantially as shown and described.

2. The combination, with the saddle-pillar F, having the horizontal member F', of a suitable clamp adjustable upon the member F', and front and rear saddle-springs held in place by said clamp, the rear spring H' being made up of two limbs or members intertwisted to form a union $h$, substantially as shown and described.

3. The combination, with the saddle-pillar F, having the horizontal member F', of the clamp G, formed substantially as shown and described, the springs H H', plate I, bolt K, and set-screws K', the spring H' being made up of two approximately parallel members formed from a single rod and intertwisted at $h$ to give lateral rigidity to the spring, substantially as shown and described.

HARRY B. OWSLEY.

Witnesses:
C. P. SMITH,
R. H. WILES.